(12) United States Patent
Niimi et al.

(10) Patent No.: US 12,263,731 B2
(45) Date of Patent: Apr. 1, 2025

(54) CONTROL DEVICE FOR VEHICLE

(71) Applicant: TOYOTA JIDOSHA KABUSHIKI KAISHA, Toyota (JP)

(72) Inventors: Yoshitaka Niimi, Toyota (JP); Manabu Ishimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/158,134

(22) Filed: Jan. 23, 2023

(65) Prior Publication Data

US 2023/0322073 A1 Oct. 12, 2023

(30) Foreign Application Priority Data

Mar. 22, 2022 (JP) ................... 2022-046095

(51) Int. Cl.
*B60K 23/08* (2006.01)
*B60K 6/387* (2007.10)
*B60K 6/52* (2007.10)
*B60K 17/356* (2006.01)

(52) U.S. Cl.
CPC .......... *B60K 23/0808* (2013.01); *B60K 6/387* (2013.01); *B60K 6/52* (2013.01); *B60K 17/356* (2013.01); *B60G 2400/38* (2013.01); *B60Y 2200/92* (2013.01); *B60Y 2400/82* (2013.01)

(58) Field of Classification Search
CPC ...... B60K 23/0808; B60K 6/387; B60K 6/52; B60K 17/356; B60G 2400/38; B60Y 2200/92; B60Y 2400/82
See application file for complete search history.

(56) References Cited

U.S. PATENT DOCUMENTS

| 5,141,072 A * | 8/1992 | Shibahata | B60K 23/0808 180/245 |
| 6,041,877 A * | 3/2000 | Yamada | B60K 6/543 180/242 |
| 6,726,593 B2 * | 4/2004 | Yamamoto | B60W 20/00 477/6 |
| 9,002,560 B2 * | 4/2015 | Hasegawa | B60K 1/02 701/22 |
| 2002/0058564 A1 * | 5/2002 | Yamamoto | B60K 6/52 477/3 |

(Continued)

FOREIGN PATENT DOCUMENTS

| CN | 109421693 A * | 3/2019 | ............. B60K 6/365 |
| JP | 2002245091 A * | 8/2002 | ............. G06F 17/50 |

(Continued)

OTHER PUBLICATIONS

Translation of CN-109421693-A, 23 pages (Year: 2019).*
Translation of JP-2002245091-A, 26 pages (Year: 2002).*

*Primary Examiner* — Dale W Hilgendorf
(74) *Attorney, Agent, or Firm* — Oliff PLC

(57) ABSTRACT

When a required drive force of an engine becomes equal to or greater than a predetermined value that deteriorates the characteristics of an engine mount, torque serving as a required drive amount of a rear electric motor is increased, so that the required drive force of the engine can be reduced. As a result, crushing of the engine mount that supports the engine is reduced, so that engine vibration transmitted to a vehicle body via the engine mount can be reduced.

9 Claims, 7 Drawing Sheets

(56) References Cited

U.S. PATENT DOCUMENTS

| | | | |
|---|---|---|---|
| 2003/0037977 A1* | 2/2003 | Tatara | B60K 6/52 903/917 |
| 2004/0104059 A1* | 6/2004 | Yamamoto | B60K 6/52 180/65.25 |
| 2005/0121248 A1* | 6/2005 | Ushiroda | B60K 23/04 180/248 |
| 2006/0047398 A1* | 3/2006 | Abe | B60W 10/06 701/69 |
| 2006/0196714 A1* | 9/2006 | Sugimoto | B60K 17/356 180/242 |
| 2012/0303201 A1* | 11/2012 | Tsuneishi | B60W 20/11 180/65.265 |
| 2013/0297133 A1* | 11/2013 | Hasegawa | B60K 1/02 903/903 |
| 2017/0282891 A1* | 10/2017 | Shimizu | B60W 10/06 |
| 2019/0077258 A1* | 3/2019 | Cho | B60K 6/52 |
| 2021/0008971 A1* | 1/2021 | Toda | B60K 6/48 |
| 2022/0161653 A1* | 5/2022 | Fujii | B60K 23/08 |
| 2022/0363239 A1 | 11/2022 | Hoshi et al. | |

FOREIGN PATENT DOCUMENTS

| | | |
|---|---|---|
| JP | 2018-083453 A | 5/2018 |
| JP | 2021-120254 A | 8/2021 |
| JP | 2021-124058 A | 8/2021 |
| WO | 2022/024273 A1 | 2/2022 |

\* cited by examiner

CONTROL DEVICE FOR VEHICLE

CROSS-REFERENCE TO RELATED APPLICATION

This application claims priority to Japanese Patent Application No. 2022-046095 filed on Mar. 22, 2022, incorporated herein by reference in its entirety.

BACKGROUND

1. Technical Field

The present disclosure relates to a control device for a vehicle capable of switching between two-wheel drive traveling and four-wheel drive traveling.

2. Description of Related Art

Japanese Unexamined Patent Application Publication No. 2021-124058 (JP 2021-124058 A) discloses a four-wheel drive vehicle based on rear-wheel drive including rear wheels connected to an engine and a rear motor so as to be able to transmit power therebetween, and front wheels connected to a front motor so as to be able to transmit power therebetween. Further, J P 2021-124058 A discloses a structure in which the engine is supported by a mount member.

SUMMARY

In a vehicle capable of switching between two-wheel drive traveling and four-wheel drive traveling, two-wheel drive traveling, in which either the front wheels or the rear wheels are driven by the power of the engine, is desirable in a normal traveling state from the viewpoint of fuel efficiency. However, as the required drive force of the engine increases, the insulator (rubber or the like) of the engine mount that supports the engine is crushed, which may make it difficult to reduce the vibration from the engine.

The present disclosure has been made in the background of the above circumstances, and an object of the present disclosure is to provide a control device for a vehicle capable of reducing vibration transmission to the vehicle (vehicle body) due to crushing of a mount member that supports the engine, the vehicle being a vehicle including first wheels driven by power of an engine and second wheels driven by power of a drive force source different from the engine.

The gist of the first disclosure is as follows.
(a) Provided is a control device for a vehicle. The vehicle includes: an engine provided in the vehicle via a mount member; and a drive force source provided separately from the engine. The engine is connected to first wheels that are either front wheels or rear wheels so as to be able to transmit power. The drive force source is connected to second wheels that are the other of the front wheels and the rear wheels so as to be able to transmit power. The control device is able to switch between two-wheel drive traveling in which the first wheels are driven by the engine, and four-wheel drive traveling in which the first wheels are driven by the engine and the second wheels are driven by the drive force source.
(b) When a required drive amount of the engine becomes equal to or greater than a predetermined value based on characteristics of the mount member while the vehicle is traveling, the control device increases a required drive amount of the drive force source.

The gist of the second disclosure is as follows.
(a) Provided is a control device for a vehicle. The vehicle includes: an engine provided in the vehicle via a mount member; and a drive force source provided separately from the engine. The engine is connected to first wheels that are either front wheels or rear wheels so as to be able to transmit power. The drive force source is connected to second wheels that are the other of the front wheels and the rear wheels so as to be able to transmit power. A transmission is provided in a power transmission path between the engine and the first wheels. The control device is able to switch between two-wheel drive traveling in which the first wheels are driven by the engine, and four-wheel drive traveling in which the first wheels are driven by the engine and the second wheels are driven by the drive force source.
(b) When an output of the drive force source is limited, the control device causes the transmission to perform shifting such that a rotation speed of the engine is maintained at a predetermined rotation speed or higher.

The gist of the third disclosure is as follows.
(a) Provided is a control device for a vehicle. The vehicle includes: an engine provided in the vehicle via a mount member; and a drive force source provided separately from the engine. The engine is connected to first wheels that are either front wheels or rear wheels so as to be able to transmit power. The drive force source is connected to second wheels that are the other of the front wheels and the rear wheels so as to be able to transmit power. The control device is able to switch between two-wheel drive traveling in which the first wheels are driven by the engine, and four-wheel drive traveling in which the first wheels are driven by the engine and the second wheels are driven by the drive force source.
(b) When a rotation speed of the engine is less than a predetermined rotation speed set based on characteristics of the mount member, the control device increases a required drive amount of the drive force source as compared to when the rotation speed of the engine is equal to or greater than the predetermined rotation speed.

The gist of the fourth disclosure is characterized by the following in the first, second, or third disclosure. The drive force source is an electric motor for traveling, and the control device performs drive force distribution to the front wheels and the rear wheels by controlling an output of the electric motor.

The gist of the fifth disclosure is characterized by the following in the fourth disclosure. The vehicle further includes a second electric motor connected to the engine so as to be able to transmit power. The second electric motor is configured to be able to generate electric power with power of the engine, and the control device drives the electric motor with at least one of electric power from a battery provided in the vehicle and electric power generated by the second electric motor.

According to the first disclosure, while the vehicle is traveling, when the required drive amount of the engine exceeds a predetermined value that deteriorates the characteristics of the mount member, the required drive amount of the drive force source is increased, so that the required drive amount of the engine can be reduced. As a result, crushing of the mount member that supports the engine is reduced, so that the vibration transmitted from the engine to the vehicle (vehicle body) via the mount member can be reduced.

According to the second disclosure, when the output of the drive force source is limited, shifting of the automatic transmission is performed so that the engine rotation speed is maintained at a value equal to or greater than the predetermined rotation speed. Therefore, the engine rotation speed is maintained at a value equal to or greater than the predetermined rotation speed, and the vehicle can continue traveling in a state in which the transmission sensitivity of the engine vibration to the vehicle is decreased. As a result, the vibration transmitted from the engine through the mount member can be reduced.

According to the third disclosure, when the engine rotation speed is less than the predetermined rotation speed set based on the characteristics of the mount member, the required drive amount for the drive force source is increased as compared to when the engine rotation speed is equal to or greater than the predetermined rotation speed. Thus, by increasing the required drive amount of the drive force source only when the engine vibration transmitted to the vehicle via the mount member is likely to be transmitted, the crushing of the mount member is reduced, and the engine vibration transmitted to the vehicle is reduced. As a result, it is possible to achieve both noise and vibration (NV) characteristics and fuel efficiency.

According to the fourth disclosure, since the drive force source is the electric motor, it is possible to perform the drive force distribution to the front wheels and the rear wheels by controlling the output of the electric motor.

According to the fifth disclosure, the power of the engine is used to generate electric power by the second electric motor, and at least one of the electric power generated by the second electric motor and the electric power from the battery is supplied to the electric motor, so that the drive force distribution to the front wheels and the rear wheels can be performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, examples of the present disclosure will be described in detail with reference to the drawings. In the following examples, the drawings are appropriately simplified or modified, and the dimensional ratios, shapes, etc. of each part are not necessarily drawn accurately.

First Example

Figure 1:
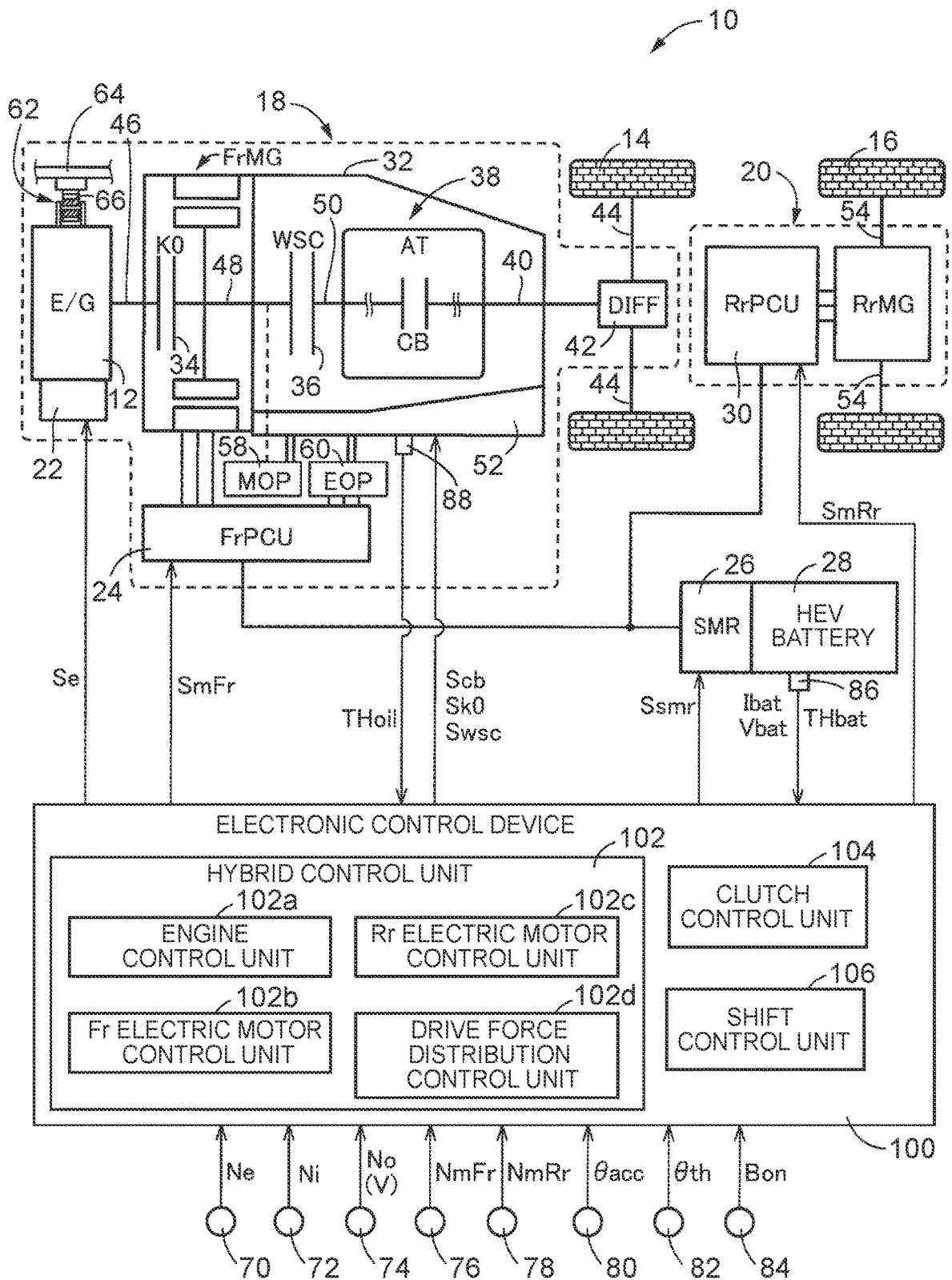
FIG. 1 is a diagram illustrating a schematic configuration of a hybrid electric vehicle to which the present disclosure is applied, and is a diagram illustrating control functions and a main part of a control system for various controls in the vehicle.

FIG. 1 is a diagram illustrating a schematic configuration of a hybrid electric vehicle 10 (hereinafter referred to as vehicle 10) to which the present disclosure is applied, and is a diagram illustrating control functions and a main part of a control system for various controls in the vehicle 10. In FIG. 1, the vehicle 10 is a front-wheel-drive-based four-wheel drive hybrid electric vehicle equipped with an engine 12 and a front electric motor FrMG, which are drive force sources for front wheels 14, and a rear electric motor RrMG, which is a drive force source for rear wheels 16. The vehicle 10 includes a front unit 18 provided in a power transmission path between the engine 12 and the front wheels 14 and a rear unit 20 for driving the rear wheels 16.

The engine 12 is a known internal combustion engine such as a gasoline engine or a diesel engine. In the engine 12, an engine torque that is an output torque of the engine 12 is controlled by controlling an engine control device 22 including a throttle actuator, a fuel injection device, an ignition device, and the like provided in the vehicle 10 by an electronic control device 100 described later.

The engine 12 is connected to a vehicle member 64 that constitutes the vehicle body, via an engine mount 62. In other words, the engine 12 is mounted on the vehicle 10 via the engine mount 62. The engine mount 62 is a support member that supports the engine 12, and an insulator such as a rubber 66 is interposed so that the vibration of the engine 12 is less likely to be transmitted to the vehicle body. Since the engine mount 62 is well-known technology, detailed description thereof will be omitted.

The front electric motor FrMG and the rear electric motor RrMG are motor generators having a function as a motor for generating mechanical power from electric power and a function as a generator for generating electric power from mechanical power.

The front electric motor FrMG is connected to a hybrid electric vehicle (HEV) battery 28 via a front inverter 24 (FrPCU) and a system main relay 26 (SMR). As for the front electric motor FrMG, the FrMG torque, which is the output torque of the front electric motor FrMG, is controlled by controlling the front inverter 24 by the electronic control device 100 which will be described later. The FrMG torque is, for example, a power running torque for the positive torque on the acceleration side and a regenerative torque for the negative torque on the deceleration side when the rotation direction of the front electric motor FrMG is a positive rotation that is the same as the rotation direction of the engine 12 when the engine 12 is operating.

The front electric motor FrMG generates traveling power from electric power supplied from the HEV battery 28 via the front inverter 24 and the system main relay 26 instead of or in addition to the engine 12. Further, the front electric motor FrMG is configured to be capable of generating electric power using the power of the engine 12 and the driven force input from the front wheel 14 side. Electric power generated by the front electric motor FrMG is stored in the HEV battery 28 via the front inverter 24 and the system main relay 26. Alternatively, electric power generated by the front electric motor FrMG is supplied to the rear electric motor RrMG to drive the rear electric motor RrMG. Unless otherwise specified, electric power also means electric energy. Unless otherwise specified, power also means torque and force.

The rear electric motor RrMG is connected to the HEV battery 28 via the rear inverter 30 (RrPCU) and the system main relay 26 (SMR). As for the rear electric motor RrMG, the RrMG torque, which is the output torque of the rear electric motor RrMG, is controlled by controlling the rear inverter 30 by the electronic control device 100 which will be described later. The RrMG torque-TmRr is, for example, a power running torque for the positive torque on the acceleration side and a regenerative torque for the negative torque on the deceleration side when the rotation direction of the rear electric motor RrMG is a positive rotation that is the same as the rotation direction when traveling forward. The rear electric motor RrMG is driven by at least one of the electric power from the HEV battery 28 and the electric power generated by the front electric motor FrMG.

The rear electric motor RrMG functions as an electric motor for traveling that generates drive force from at least one of the electric power supplied from the HEV battery 28 via the rear inverter 30 and the system main relay 26 and the electric power generated by the front electric motor FrMG. Further, the rear electric motor RrMG generates electric power using the driven force input from the rear wheel 16 side. Electric power generated by the rear electric motor RrMG is stored in the HEV battery 28 via the rear inverter 30 and the system main relay 26. The HEV battery 28 is a power storage device that transmits and receives electric power to and from the front electric motor FrMG and the rear electric motor RrMG. The HEV battery 28 corresponds to the battery of the present disclosure, and the rear electric motor RrMG corresponds to the drive force source provided separately from the engine of the present disclosure.

The front unit 18 is configured to be able to transmit the power of the engine 12 and the front electric motor FrMG to the front wheels 14. The front unit 18 includes the engine 12, a K0 clutch 34 (K0), an input clutch 36 (WSC), an automatic transmission 38, and the like. The K0 clutch 34 (K0), the input clutch 36 (WSC), and the automatic transmission 38 are housed in a case 32, which is a non-rotating member attached to the vehicle body. The K0 clutch 34 is a clutch provided between the engine 12 and the front electric motor FrMG in the power transmission path between the engine 12 and the front wheels 14. The input clutch 36 is a clutch provided between the K0 clutch 34 and the automatic transmission 38 in the power transmission path between the engine 12 and the front electric motor FrMG, and the front wheels 14. The front wheels 14 correspond to the first wheels of the present disclosure, and the front electric motor FrMG corresponds to the second electric motor of the present disclosure.

The automatic transmission 38 is provided in the power transmission path between the engine 12 and the front electric motor FrMG, and the front wheels 14. The front unit 18 also includes a differential device 42 (DIFF) connected to a transmission output shaft 40 of the automatic transmission 38, a pair of right and left front wheel axles 44 connected to the front wheels 14, and the like. The front unit 18 also includes an engine connection shaft 46 that connects the engine 12 and the K0 clutch 34 and an electric motor connection shaft 48 that connects the K0 clutch 34 and the input clutch 36. The automatic transmission 38 corresponds to the transmission of the present disclosure.

The front electric motor FrMG is connected to the electric motor connection shaft 48 in the case 32 so as to be able to transmit power. The front electric motor FrMG is connected to the power transmission path between the engine 12 and the front wheels 14, particularly the power transmission path between the K0 clutch 34 and the input clutch 36 so as to be able to transmit power. Therefore, the front electric motor FrMG is connected to the input clutch 36 and the automatic transmission 38 so as to be able to transmit power without the K0 clutch 34.

The automatic transmission 38 is a known planetary gear automatic transmission including, for example, one set or a plurality of sets of planetary gear devices (not shown) and a plurality of engaging devices CB. The engaging device CB is a hydraulic friction engaging device composed of, for example, a multi-plate or a single-plate clutch and a brake pressed by a hydraulic actuator, a band brake tightened by the hydraulic actuator, or the like. In the engaging device CB, the control state such as the engaged state and the released state is switched by changing the CB torque, which is the respective torque capacity, by the adjusted CB hydraulic pressure supplied from a hydraulic control circuit 52. Since the power transmission state of the automatic transmission 38 is switched according to the engaged state of the engaging device CB, the engaging device CB is interposed in the power transmission path between the engine 12 and the front electric motor FrMG, and the front wheels 14, and has a function of connecting and disconnecting power transmission in the power transmission path.

The automatic transmission 38 is a stepped transmission in which any one of a plurality of gears (also referred to as gear stages) having different gear ratios (=automatic transmission (AT) input rotation speed Ni/AT output rotation speed No) is established by engaging any of the engaging devices CB. The automatic transmission 38 of the present example is configured to be capable of shifting to gear stages of six forward speeds and one reverse speed. In the automatic transmission 38, the gear stages are switched, that is, a plurality of gear stages are selectively established in accordance with the accelerator operation of the driver, the vehicle speed V, and the like by the electronic control device 100 described later. The AT input rotation speed Ni is the rotation speed of a transmission input shaft 50 of the automatic transmission 38 and is the input rotation speed of the automatic transmission 38. The AT output rotation speed No is the rotation speed of the transmission output shaft 40 of the automatic transmission 38 and is the output rotation speed of the automatic transmission 38.

The K0 clutch 34 is a wet or dry friction engaging device composed of, for example, a multi-plate or a single-plate clutch. The control state of the K0 clutch 34 is switched between states such as the engaged state and the released state by the electronic control device 100 described later. The control state of the K0 clutch 34 is switched by changing the K0 torque, which is the torque capacity of the K0 clutch 34, with the K0 hydraulic pressure supplied from the hydraulic control circuit 52.

The input clutch 36 is a wet or dry friction engaging device composed of, for example, a multi-plate or a single-plate clutch. The control state of the input clutch 36 is switched between states such as the engaged state and the released state by the electronic control device 100 described later. The control state of the input clutch 36 is switched by changing the WSC torque, which is the torque capacity of the input clutch 36, with the WSC hydraulic pressure supplied from the hydraulic control circuit 52.

In the engaged state of the K0 clutch 34, the engine 12 and the front electric motor FrMG are connected via the engine connection shaft 46 and the electric motor connection shaft 48 so as to be able to transmit power. That is, when the K0 clutch 34 is engaged, the K0 clutch 34 connects the engine 12 and the front electric motor FrMG so as to be able to transmit power. On the other hand, in the released state of the K0 clutch 34, the power transmission between the engine 12 and the front electric motor FrMG is cut off. That is, when the K0 clutch 34 is released, the engine 12 and the front electric motor FrMG are disconnected. In other words, the K0 clutch 34 is a connecting/disconnecting clutch that connects the engine 12 and the front electric motor FrMG by being engaged, and disconnects the connection between the engine 12 and the front electric motor FrMG by being released.

In the engaged state of the input clutch 36, the electric motor connection shaft 48 and the transmission input shaft 50 are connected. At this time, the front electric motor FrMG is connected to the front wheels 14 via the electric motor connection shaft 48, the input clutch 36, the transmission input shaft 50, the transmission output shaft 40, the differential device 42, and the front wheel axles 44 so as to be able to transmit power. Further, when the K0 clutch 34 and the input clutch 36 are engaged, in addition to the front electric motor FrMG, the engine 12 is connected to the front wheels 14 via the electric motor connection shaft 48, the input clutch 36, the transmission input shaft 50, the transmission output shaft 40, the differential device 42, and the front wheel axles 44 so as to be able to transmit power. On the other hand, when the input clutch 36 is released, the connection between the electric motor connection shaft 48 and the transmission input shaft 50 is cut off. In other words, the input clutch 36 is a connecting/disconnecting clutch that connects the engine 12 and the front electric motor FrMG with the front wheels 14 by being engaged, and disconnects the connection between the engine 12 and the front electric motor FrMG, and the front wheels 14 by being released.

In the front unit 18, when the K0 clutch 34 and the input clutch 36 are engaged, the power output from the engine 12 is transmitted to the front wheels 14 via the engine connection shaft 46, the electric motor connection shaft 48, the transmission input shaft 50, the automatic transmission 38, the transmission output shaft 40, the differential device 42, and the front wheel axles 44 in sequence. Further, when the input clutch 36 is engaged, the power output from the front electric motor FrMG is transmitted to the front wheels 14 via the electric motor connection shaft 48, the transmission input shaft 50, the automatic transmission 38, the transmission output shaft 40, the differential device 42, and the front wheel axles 44 in sequence.

On the other hand, when the input clutch 36 is released, the power transmission path between the engine 12 and the front electric motor FrMG, and the front wheels 14 is cut off, and the power of the engine 12 and the front electric motor FrMG is no longer transmitted to the front wheels 14. Further, when the input clutch 36 is engaged while the K0 clutch 34 is released, the power of the front electric motor FrMG is transmitted to the front wheels 14 via the automatic transmission 38 and the like, while the power of the engine 12 is no longer transmitted to the front wheels 14. Further, when the input clutch 36 is released while the K0 clutch 34 is engaged, the power of the engine 12 and the front electric motor FrMG is not transmitted to the front wheels 14, but the engine 12 and the front electric motor FrMG are connected so as to be able to transmit power. At this time, the power of the engine 12 can be used to generate electric power by the front electric motor FrMG.

The rear unit 20 is configured to be able to transmit power of the rear electric motor RrMG to the rear wheels 16. The rear unit 20 includes the rear inverter 30 controlled by the electronic control device 100 to be described later, the rear electric motor RrMG, a pair of right and left rear wheel axles 54 connected to the right and left rear wheels 16, and the like. The rear electric motor RrMG is connected to the pair of right and left rear wheel axles 54 directly or via a reduction gear or the like (not shown). Accordingly, the rear electric motor RrMG is connected to the rear wheels 16 via the rear wheel axles 54 and the like so as to be able to transmit power, so that the power output from the rear electric motor RrMG is transmitted to the rear wheels 16 via the rear wheel axles 54 and the like. The rear wheels 16 correspond to the second wheels of the present disclosure, and the rear electric motor RrMG corresponds to the electric motor of the present disclosure.

The vehicle 10 includes a mechanical oil pump 58 (MOP) and an electric oil pump 60 (EOP). The mechanical oil pump 58 is connected to, for example, the electric motor connection shaft 48 via gears, belts, chains, or the like so as to be able to transmit power, and is driven by at least one of the engine 12 and the front electric motor FrMG to discharge the hydraulic oil to be used in the front unit 18. The electric oil pump 60 is rotationally driven by a pump motor (not shown) to discharge hydraulic oil. Hydraulic oil discharged from the mechanical oil pump 58 and the electric oil pump 60 is supplied to the hydraulic control circuit 52. The hydraulic control circuit 52 supplies the adjusted CB hydraulic pressure PRcb, the adjusted K0 hydraulic pressure PRK0, the adjusted WSC hydraulic pressure PRwsc, and the like, using hydraulic oil discharged from the mechanical oil pump 58 and the electric oil pump 60.

The vehicle 10 further includes the electronic control device 100 (control device) including a control device of the vehicle 10 related to travel control and the like. The electronic control device 100 is configured to include, for example, a so-called microcomputer provided with a central processing unit (CPU), a random access memory (RAM), a read-only memory (ROM), an input/output interface, and the like. The CPU performs signal processing in accordance with a program stored in the ROM in advance while using the temporary storage function of the RAM, thereby executing various controls of the vehicle 10. The electronic control device 100 includes ECUs for engine control, electric motor control, hydraulic pressure control, and the like, as necessary.

The electronic control device 100 is supplied with various signals (for example, the engine rotation speed Ne, which is the rotation speed of the engine 12, the AT input rotation speed Ni, which is the rotation speed of the transmission input shaft 50 of the automatic transmission 38, the AT output rotation speed No, which is the rotation speed of the transmission output shaft 40 of the automatic transmission 38 and which corresponds to the vehicle speed V, the FrMG rotation speed NmFr, which is the rotation speed of the front electric motor FrMG, the RrMG rotation speed NmRr, which is the rotation speed of the rear electric motor RrMG, the accelerator operation amount Oacc, which is the accelerator operation amount of the driver indicating the magnitude of the acceleration operation of the driver, the throttle valve opening Oth, which is the opening degree of the electronic throttle valve, the brake-on signal Bon, which is a signal indicating that the brake pedal for operating the wheel brake is being operated by the driver, the battery temperature THbat, the battery charge/discharge current Ibat, and the battery voltage Vbat of the HEV battery 28, the hydraulic oil temperature THoil, which is the temperature of the hydraulic oil in the hydraulic control circuit 52, etc.) based on detection values detected by various sensors (for example, an engine rotation speed sensor 70, an input rotation speed sensor 72, an output rotation speed sensor 74, a FrMG rotation speed sensor 76, a RrMG rotation speed sensor 78, an accelerator operation amount sensor 80, a throttle valve opening sensor 82, a brake switch 84, a battery sensor 86, an oil temperature sensor 88, etc.) provided in the vehicle 10.

Various command signals (for example, the engine control command signal Se for controlling the engine 12, the FrMG control command signal SmFr for controlling the front electric motor FrMG, the RrMG control command signal SmRr for controlling the rear electric motor RrMG, the CB hydraulic control command signal Scb for controlling the engaging device CB, the K0 hydraulic control command signal Sk0 for controlling the K0 clutch 34, the WSC hydraulic control command signal Swsc for controlling the input clutch 36, the relay switching command signal Ssmr for switching the connected/disconnected state of the system main relay 26, etc.) are output from the electronic control device 100 to each of the devices (for example, the engine control device 22, the front inverter 24, the rear inverter 30, the hydraulic control circuit 52, the system main relay 26, etc.) provided in the vehicle 10. The system main relay 26 is switched to the connected state by the relay switching command signal Ssmr, for example, when the power switch of the vehicle 10 is switched to the ON state, so that electric power can be supplied from the HEV battery 28.

In order to achieve various travel controls in the vehicle 10, the electronic control device 100 functionally includes a hybrid control unit 102 functioning as hybrid control means, a clutch control unit 104 functioning as clutch control means, and a shift control unit 106 functioning as shift control means.

The hybrid control unit 102 functionally includes an engine control unit 102a functioning as engine control means for controlling the operation of the engine 12, an Fr electric motor control unit 102b functioning as Fr electric motor control means for controlling the operation of the front electric motor FrMG via the front inverter 24, and an Rr electric motor control unit 102c functioning as Rr motor control means for controlling the operation of the rear electric motor RrMG via the rear inverter 30. With these control functions, hybrid drive control and the like are executed by the engine 12, the front electric motor FrMG, and the rear electric motor RrMG.

The hybrid control unit 102 calculates the required drive amount for the vehicle 10 by the driver by applying the accelerator operation amount θacc and the vehicle speed V to the required drive amount map, for example. The required drive amount map indicates a relationship that is obtained experimentally or by design and stored in advance, that is, a predetermined relationship. The required drive amount is, for example, a vehicle required drive force Frdem. As the required drive amount, the required drive torque, the required AT output torque at the transmission output shaft 40 of the automatic transmission 38, and the like can be used. In the calculation of the required drive amount, the AT output rotation speed No or the like may be used instead of the vehicle speed V.

The hybrid control unit 102 outputs the engine control command signal Se for controlling the engine 12, the FrMG control command signal SmFr for controlling the front electric motor FrMG, and the RrMG control command signal SmRr for controlling the rear electric motor RrMG to achieve the required drive power in consideration of the transmission loss, the auxiliary load, the gear ratio of the automatic transmission 38, the rechargeable power and the dischargeable power of the HEV battery 28, and the like. The engine control command signal Se is, for example, a command value of the engine power, which is the power of the engine 12 that outputs the engine torque at the engine rotation speed Ne at that time. The FrMG control command signal SmFr is, for example, a command value of the power consumption of the front electric motor FrMG that outputs the FrMG torque at the FrMG rotation speed NmFr at that time. The RrMG control command signal SmRr is, for example, a command value of the power consumption of the rear electric motor RrMG that outputs the RrMG torque at the RrMG rotation speed NmRr at that time.

The rechargeable power of the HEV battery 28 is the maximum electric power that can be input that defines the limit of the input electric power of the HEV battery 28, and indicates the input limit of the HEV battery 28. The dischargeable power of the HEV battery 28 is the maximum electric power that can be output that defines the limit of the output electric power of the HEV battery 28, and indicates the output limit of the HEV battery 28. The rechargeable power and the dischargeable power of the HEV battery 28 are calculated by the electronic control device 100 based on, for example, the battery temperature THbat and the charge state value [%] of the HEV battery 28. The charge state value of the HEV battery 28 is a value indicating the charge state of the HEV battery 28, and is calculated by the electronic control device 100 based on, for example, the battery charge/discharge current Ibat and the battery voltage Vbat.

When the required drive torque can be covered only by the output of at least one of the front electric motor FrMG and the rear electric motor RrMG, the hybrid control unit 102 sets the traveling mode to the motor traveling (=BEV traveling) mode. In the BEV traveling mode, the hybrid control unit 102 performs battery electric vehicle (BEV) traveling using at least one of the front electric motor FrMG and the rear electric motor RrMG as a drive force source with the K0 clutch 34 released and the input clutch 36 engaged.

On the other hand, when the required drive torque cannot be covered unless at least the output of the engine 12 is used, the hybrid control unit 102 sets the traveling mode to the engine traveling mode, that is, the hybrid traveling (=HEV traveling) mode. In the HEV traveling mode, the hybrid control unit 102 performs engine traveling, that is, hybrid electric vehicle (HEV) traveling, in which the K0 clutch 34 and the input clutch 36 are in the engaged state and the vehicle travels using at least the engine 12 as a drive force source. Even when the required drive torque can be covered using the output of at least one of the front electric motor FrMG and the rear electric motor RrMG, the hybrid control unit 102 establishes the HEV traveling mode when the charge state value of the HEV battery 28 is less than a predetermined engine start threshold value, when warming up of the engine 12 is required, and the like. The engine start threshold value is a predetermined threshold value for determining that the charge state value indicates the need to forcibly start the engine 12 to charge the HEV battery 28. In this way, the hybrid control unit 102 automatically stops the engine 12 during the HEV traveling, restarts the engine 12 after the engine is stopped, or starts the engine 12 during the BEV traveling based on the required drive torque, the required drive power, or the like, thereby switching between the BEV traveling mode and the HEV traveling mode.

In addition, while traveling in the HEV traveling mode, the power of the engine 12 is transmitted to the front wheels 14 as drive force, and a part of the power of the engine 12 is transmitted to the front electric motor FrMG, so that the front electric motor FrMG can generate electric power. Furthermore, by supplying the generated electric power generated by the front electric motor FrMG to the rear electric motor RrMG, the rear electric motor RrMG can be driven to allow the vehicle 10 to perform four-wheel drive traveling. Therefore, the vehicle 10 is configured to be switchable between two-wheel drive traveling, in which the front wheels 14 are driven exclusively by the power of the engine 12, and four-wheel drive traveling, in which the front wheels 14 are driven by the power of the engine 12 and the rear wheels 16 are driven by the power of the rear electric motor RrMG.

The hybrid control unit 102 functionally includes a drive force distribution control unit 102d as drive force distribution control means that properly distributes the drive force to the front and rear wheels (the front wheels 14 and the rear wheels 16) in accordance with the traveling state of the vehicle 10, and performs control so that appropriate traveling performance can be obtained. The drive force distribution control unit 102d calculates an appropriate drive force distribution ratio R between the front and rear wheels based on the traveling state of the vehicle 10. The drive force distribution control unit 102d also calculates the outputs of the engine 12, the front electric motor FrMG, and the rear electric motor RrMG that match the calculated drive force distribution ratio R. The hybrid control unit 102 controls the engine 12, the front electric motor FrMG, and the rear electric motor RrMG so that the calculated outputs of the engine 12, the front electric motor FrMG, and the rear electric motor RrMG are achieved. As a result, the outputs of the engine 12, the front electric motor FrMG, and the rear electric motor RrMG are controlled so as to achieve the calculated drive force distribution ratio R, thereby performing the drive force distribution to the front and rear wheels. In this manner, the vehicle 10 is configured to be able to adjust the drive force distribution between the front and rear wheels. In the present example, the drive force distribution ratio R is defined by the ratio of the drive force transmitted to the rear wheels 16 to the vehicle required drive force Frdem. For example, when the drive force distribution ratio R is zero, two-wheel drive traveling is performed in which only the front wheels 14 are driven. Further, when the drive force distribution ratio R is 0.2, four-wheel drive traveling is performed in which the drive force ratio between the front wheels 14 and the rear wheels 16 is 80:20.

The drive force distribution control unit 102d sets the drive force distribution ratio R to zero, for example, at low speed traveling while the load during traveling is small. That is, the drive force distribution control unit 102d executes two-wheel drive traveling in which the rear electric motor RrMG is stopped and the front wheels 14 are driven solely by the power of the engine 12 at low speed traveling while the load during traveling is small. Further, the drive force distribution control unit 102d sets the drive force distribution ratio R to a value greater than zero to execute four-wheel drive traveling in which the rear wheels 16 are driven in addition to driving the front wheels 14 when the vehicle starts, accelerates, or travels on a slippery low μ road, for example.

When the generated electric power generated by the front electric motor FrMG is supplied to the rear electric motor RrMG, the power of the engine 12 is converted into electric energy, transmitted to the rear electric motor RrMG, and converted again into drive force by the rear electric motor RrMG, so that the energy efficiency becomes poor. Therefore, from the viewpoint of fuel efficiency, it is desirable to use the power of the engine 12 exclusively to drive the front wheels 14. On the other hand, when the vehicle 10 is caused to travel by the drive force of the engine 12, the amount of displacement of the rubber 66 constituting the engine mount 62 (that is, the amount of crushing of the rubber 66) increases due to the reaction force against the drive force of the engine 12. At this time, since the rubber 66 hardens, the vibration of the engine 12 (engine vibration) is easily transmitted to the vehicle body side (vehicle side) through the engine mount 62. The engine mount 62 corresponds to the mount member of the present disclosure.

Figure 2:
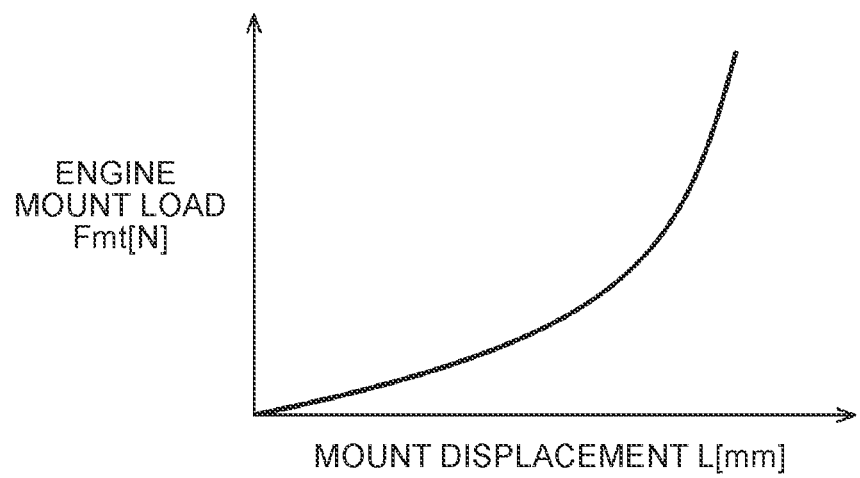
FIG. 2 is a diagram showing the relationship between mount displacement and engine mount load while an engine is driven.

FIG. 2 shows the relationship between the mount displacement L [mm] and the engine mount load Fmt [N] while the engine 12 is driven. The mount displacement L corresponds to the amount of deformation (that is, the amount of crushing) of the rubber 66 constituting the engine mount 62. The engine mount load Fmt is the load applied to the engine mount 62 while the engine is driven, and corresponds to the reaction force against the drive force of the engine 12. The engine mount load Fmt increases in proportion to the drive force of the engine 12. As shown in FIG. 2, the greater the mount displacement L, the steeper the inclination of increase in the engine mount load Fmt. Accordingly, the greater the engine mount load Fmt, the harder the rubber 66 becomes, making it more difficult for the rubber 66 to deform, thereby increasing the transmission sensitivity of engine vibration. That is, the greater the engine mount load Fmt is, the easier it is for the engine vibration to be transmitted to the vehicle body through the engine mount 62.

In view of this, when the required drive force Fedem of the engine becomes equal to or greater than a predetermined value Fcri set in advance, while the vehicle is traveling, the drive force distribution control unit 102d increases the drive force distribution ratio R from the current value. That is, when the required drive force Fedem, which is the required drive amount of the engine 12, becomes equal to or greater than the predetermined value Fcri set in advance, while the vehicle is traveling, the drive force distribution control unit 102d increases the RrMG torque, TmRr, which is the required drive amount of the rear electric motor RrMG.

Figure 3:
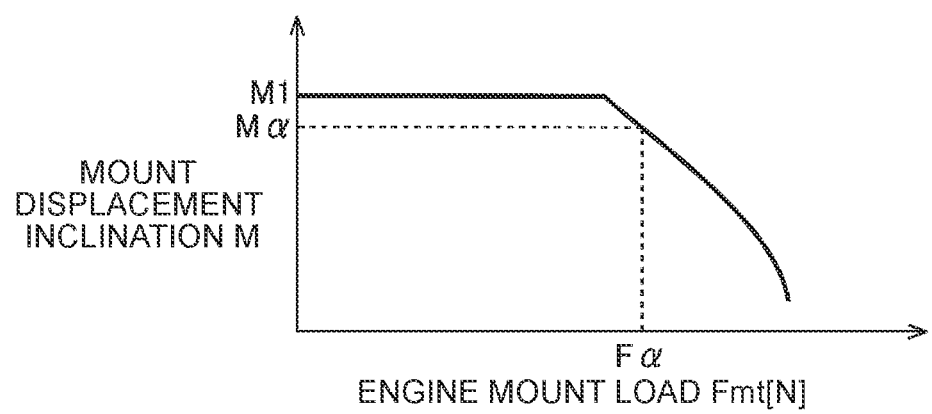
FIG. 3 is a diagram showing the relationship between the engine mount load and the inclination of the mount displacement.

Here, the predetermined value Fcri of the engine 12 is obtained experimentally or by design in advance, and is set based on the characteristics of the engine mount 62. FIG. 3 shows the relationship between the engine mount load Fmt and the inclination M of the mount displacement L. As shown in FIG. 3, in a region where the engine mount load Fmt is small, the inclination M of the mount displacement L is a constant value M1. However, when the engine mount load Fmt exceeds a predetermined value, the inclination M of the mount displacement L decreases as the engine mount load Fmt increases. In other words, when the engine mount load Fmt exceeds a predetermined value, the rubber 66 of the engine mount 62 hardens, and the function of suppressing the transmission sensitivity of engine vibration due to the elastic deformation of the rubber 66 decreases.

Accordingly, the predetermined value Fcri of the engine 12 is set to a value corresponding to the load Fa of the engine mount load Fmt at which the inclination M of the mount displacement L is an inclination Ma smaller than the constant value M1. This load Fa is set to a threshold value at which engine vibration transmitted to the vehicle body via the engine mount 62 is within an allowable range. Further, since the drive force of the engine 12 and the engine mount load Fmt have a one-to-one relationship, when the engine mount load Fmt is determined, the corresponding drive force of the engine 12 is uniquely determined.

Figure 4:
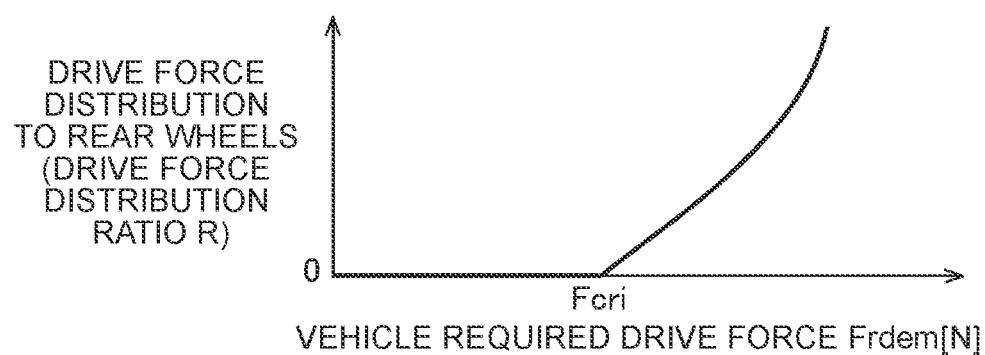
FIG. 4 is a diagram showing one mode of a relationship map between a vehicle required drive force and a drive force distribution ratio to rear wheels.

When the drive force of the engine 12 reaches a predetermined value Fcri, the drive force distribution control unit 102d determines the drive force distribution between the front and rear wheels (that is, the drive force distribution ratio R) based on the relationship map shown in FIG. 4.

FIG. 4 shows an example of a relationship map between the vehicle required drive force Frdem [N] and the drive force distribution to the rear wheels 16, that is, the drive force distribution ratio R. FIG. 4 shows, by way of example, a relationship map that is applied during two-wheel drive traveling. During two-wheel drive traveling, the vehicle required drive force Frdem is equivalent to the required drive force Fedem of the engine 12. As shown in FIG. 4, when the vehicle required drive force Frdem (that is, the required drive force Fedem of the engine 12) is less than the predetermined value Fcri, the drive force distribution ratio R is set to zero, and two-wheel drive traveling is allowed. On the other hand, when the vehicle required drive force Frdem (that is, the required drive force Fedem of the engine 12) becomes equal to or greater than the predetermined value Fcri during two-wheel drive traveling, the drive force distribution ratio R increases as the vehicle required drive force Frdem increases. The drive force distribution ratio R to the vehicle required drive force Frdem in the region where the vehicle required drive force Frdem is equal to or greater than the predetermined value Fcri is set in consideration of the characteristics of the engine mount 62, and is set so that the required drive force Fedem of the engine 12 does not exceed the predetermined value Feri even if the vehicle required drive force Frdem increases. As a result, as shown in FIG. 4, the drive force distribution ratio R changes curvilinearly according to the vehicle required drive force Frdem, and the drive force distribution ratio R changes linearly according to the vehicle required drive force Frdem.

Although FIG. 4 is a relationship map applied during two-wheel drive traveling, the drive force distribution ratio R may be determined using the relationship map of FIG. 4 even during four-wheel drive traveling. For example, a new drive force distribution ratio R can be determined by adding the drive force distribution ratio R obtained from the relationship map of FIG. 4 to the drive force distribution ratio R that is currently set. Alternatively, a relationship map of the drive force distribution ratio R to the vehicle required drive force Frdem may be obtained in consideration of the current drive force distribution ratio R, and the drive force distribution ratio R may be set based on the above relationship map during four-wheel drive traveling.

Figure 5:
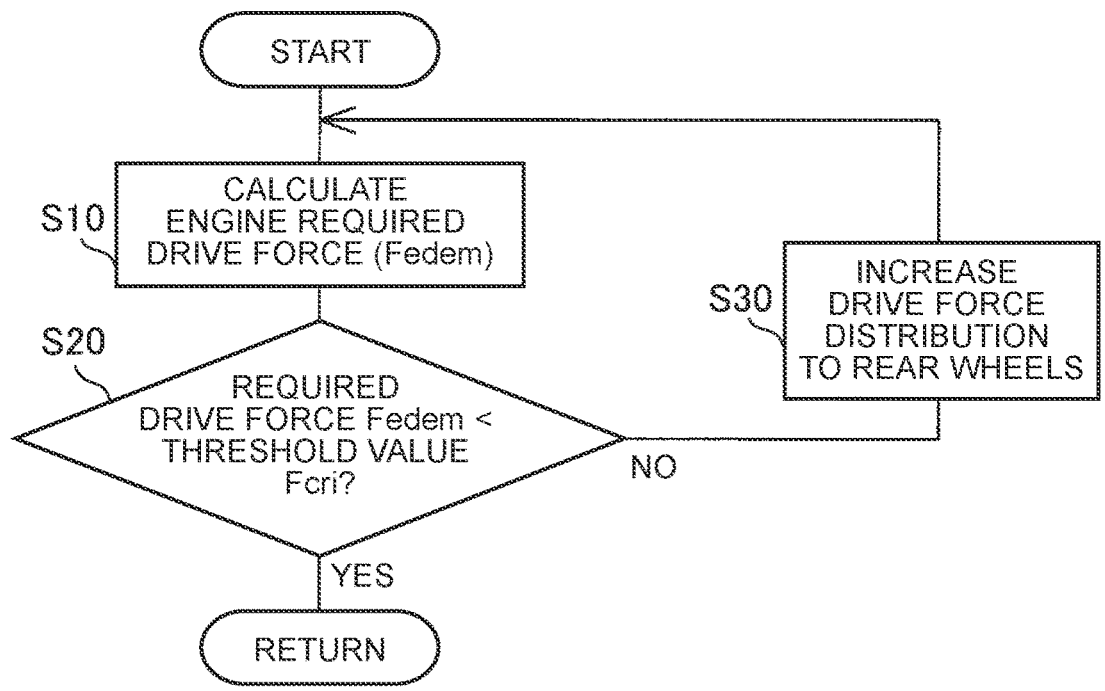
FIG. 5 is a flowchart illustrating main control functions of an electronic control device.

FIG. 5 is a flowchart illustrating the main control functions of the electronic control device 100 and is a flowchart illustrating a control operation that can effectively reduce engine vibration transmitted to the vehicle body side (vehicle side) via the engine mount 62. This flowchart is repeatedly executed while the vehicle is traveling.

First, in step (hereinafter, step is omitted) S10 corresponding to the control function of the drive force distribution control unit 102d, the required drive force Fedem of the engine 12 is calculated. For example, the drive force distribution ratio R is determined based on the traveling state of the vehicle 10 (climbing or turning), and further, the required drive force Fedem of the engine 12 that achieves the obtained drive force distribution ratio R is calculated based on the vehicle required drive force Frdem obtained from the determined drive force distribution ratio R, the accelerator operation amount θacc, and the like. Next, in S20 corresponding to the control function of the drive force distribution control unit 102d, it is determined whether the required drive force Fedem of the engine 12 calculated in S10 is less than the predetermined value Fcri. When an affirmative determination is made in S20, this routine is terminated.

On the other hand, when a negative determination is made in S20, the required drive force Fedem of the engine 12 becomes equal to or greater than the predetermined value Fcri, and in S30 corresponding to the control function of the drive force distribution control unit 102d at this time, the drive force distribution ratio R is increased based on the relationship map shown in FIG. 4. Therefore, while the drive force distribution to the rear wheels 16 increases, the drive force distribution to the front wheels 14 decreases, so the required drive force Fedem of the engine 12 decreases and the required drive force Fedem becomes equal to or less than the predetermined value Fcri. As a result, since the engine mount load Fmt applied to the engine mount 62 becomes smaller than the load Fa, the condition of the engine mount 62 is improved, and the engine vibration transmitted to the vehicle body via the engine mount 62 falls within the allowable range. In relation to this, deterioration of NV characteristics such as muffled noise and mount vibration due to engine vibration is suppressed.

Figure 6:
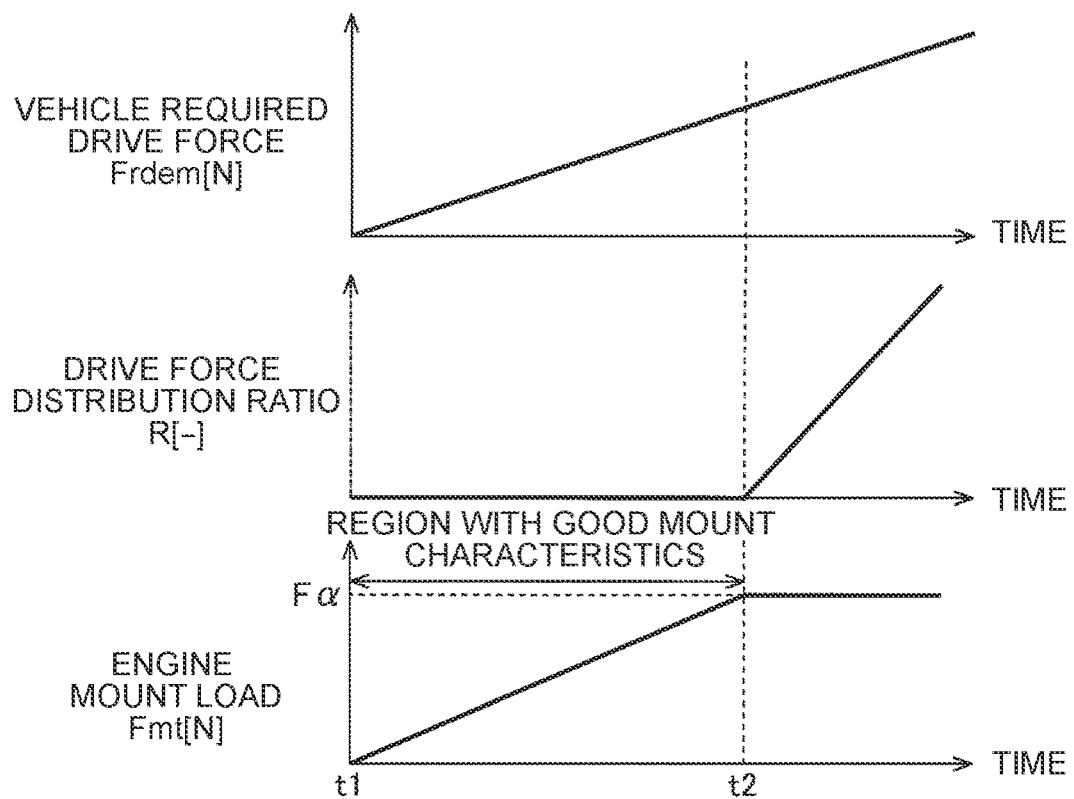
FIG. 6 is a time chart showing control results based on the control operation of the electronic control device of FIG. 1.

FIG. 6 is a time chart showing control results based on the control operation of the electronic control device 100. This time chart shows, as an example, a mode when an acceleration operation is performed from the vehicle stopped state.

Since the accelerator pedal is depressed at time t1 in FIG. 6, the vehicle required drive force Frdem increases at time t1 and after. The engine mount load Fmt increases because the required drive force Fedem of the engine 12 increases with the increase in the vehicle required drive force Frdem. At time t2, when the engine mount load Fmt reaches the load Fa, the drive force distribution ratio R increases thereafter. At time t2 and after, the FrMG torque of the rear electric motor RrMG transmitted to the rear wheels 16 increases as the drive force distribution ratio R increases, so that the engine mount load Fmt is controlled so as not to exceed the load Fa. As a result, even when the vehicle required drive force Frdem increases, the engine mount load Fmt is maintained to be equal to or lower than the load Fa in which the characteristics of the engine mount 62 are good, so the transmission sensitivity of engine vibration is maintained within an allowable range. Therefore, deterioration of NV characteristics due to transmission of engine vibration to the vehicle body via the engine mount 62 is suppressed.

As described above, according to the present example, when the required drive force Fedem of the engine 12 becomes equal to or greater than the predetermined value Fcri that deteriorates the characteristics of the engine mount 62, the RrMG torque serving as the required drive amount of the rear electric motor RrMG is increased, so that the required drive force Fedem of the engine 12 can be reduced. As a result, crushing of the engine mount 62 that supports the engine 12 is reduced, so that the engine vibration transmitted to the vehicle 10 (vehicle body) via the engine mount 62 can be reduced.

Another example of the present disclosure will now be described. In the following description, the same reference signs are given to the parts common to the above-described example, and the description thereof is omitted.

Second Example

Figure 7:
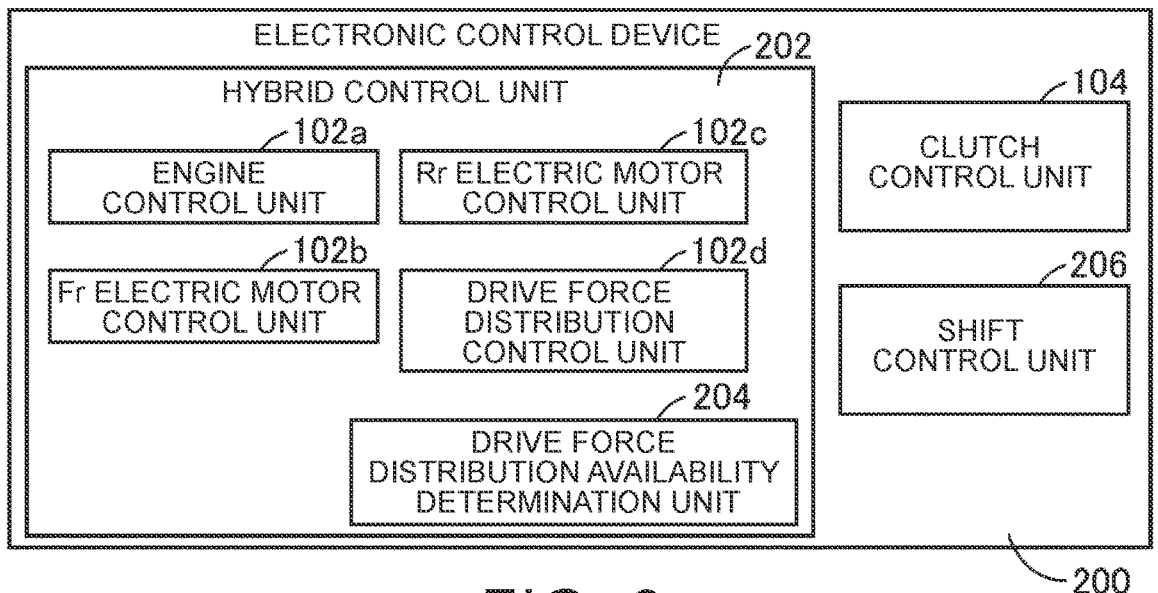
FIG. 7 is a functional block diagram illustrating main control functions of an electronic control device according to another example of the present disclosure.

In the first example described above, when the engine mount load Fmt applied to the engine mount 62 becomes equal to or greater than the load Fa, the RrMG torque of the rear electric motor RrMG is increased so that the increase in the engine mount load Fmt is suppressed to suppress the deterioration of the NV performance. In the present example, the case where the output of the rear electric motor RrMG is limited and the drive force distribution between the front and rear wheels as in the first example cannot be performed will be described. FIG. 7 is a functional block diagram illustrating main control functions of an electronic control device 200 according to the present example. Note that the structure of the vehicle controlled by the electronic control device 200 is the same as that of the vehicle 10 of the above-described example, so the description thereof will be omitted.

The electronic control device 200 functionally includes a hybrid control unit 202, a clutch control unit 104, and a shift control unit 206. Note that the clutch control unit 104 has the same function as that of the above-described example, so the same reference signs are given and the description thereof is omitted.

In addition to the functions of the hybrid control unit 102 of the above-described example, the hybrid control unit 202 functionally includes a drive force distribution availability determination unit 204 (hereinafter referred to as availability determination unit 204) that functions as drive force availability determination means.

The availability determination unit 204 determines whether the drive force distribution between the front and rear wheels can be properly achieved. For example, when the RrMG torque output from the rear electric motor RrMG is limited, the availability determination unit 204 determines that the drive force distribution between the front and rear wheels cannot be properly achieved. Further, the availability determination unit 204 determines that the drive force distribution to the front and rear wheels cannot be properly achieved when the power generation amount of the front electric motor FrMG is limited in a state where the rear electric motor RrMG is driven by the electric power generated by the front electric motor FrMG.

Cases where the RrMG torque output from the rear electric motor RrMG is limited include, for example, when an abnormality is detected in the rear electric motor RrMG, when the motor temperature of the rear electric motor RrMG is equal to or greater than a threshold value for limiting the output of the rear electric motor RrMG, when the charge state value of the HEV battery 28 is less than a threshold value for regulating the dischargeable power to a predetermined value or less, when the battery temperature THbat of the HEV battery 28 is within the range in which the output of the HEV battery 28 is regulated, etc. Further, cases where the amount of electric power generated by the front electric motor FrMG is limited include, for example, when the motor temperature of the front electric motor FrMG is equal to or higher than a preset specified value. At this time, the RrMG torque output from the rear electric motor RrMG is limited, so that it is difficult to appropriately control the drive force distribution between the front and rear wheels, making it difficult to suppress the engine vibration transmitted to the vehicle body side via the engine mount 62 by controlling the RrMG torque of the rear electric motor RrMG.

When the output of the rear electric motor RrMG is limited in this way, the shift control unit 206 causes the automatic transmission 38 to shift gears so that the engine rotation speed Ne of the engine 12 is maintained at a value equal to or greater than the predetermined rotation speed Nea.

Figure 8:
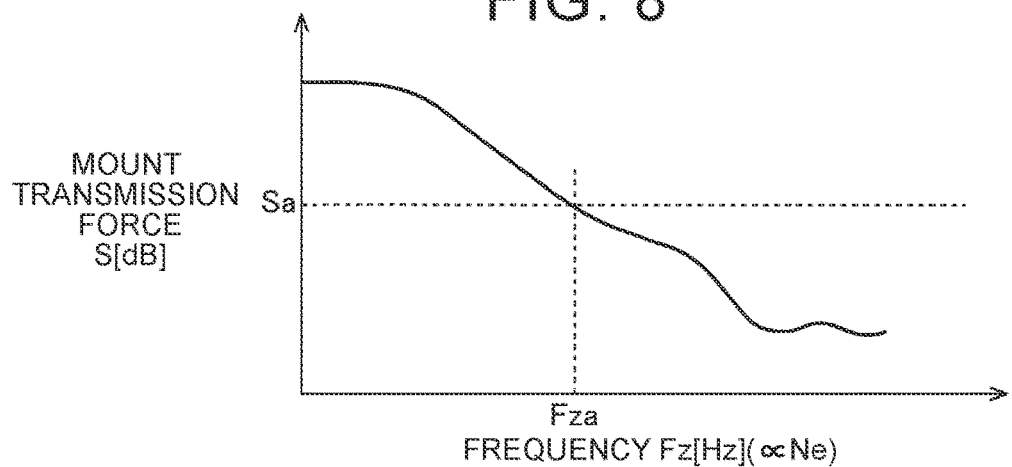
FIG. 8 is a diagram showing the relationship between engine frequency and mount transmission force in the primary combustion of the engine.

FIG. 8 shows the relationship between the vibration frequency Fz [Hz] due to the combustion of the engine 12 and the mount transmission force S [dB]. The frequency Fz is the frequency Fz of the vibration caused by the combustion of the engine 12, and is proportional to the engine rotation speed Ne. The mount transmission force S [dB] corresponds to the magnitude of vibration transmitted to the vehicle body through the engine mount 62, and the greater the mount transmission force S, the greater the vibration transmitted through the engine mount 62 to the vehicle body. As shown in FIG. 8, the higher the frequency Fz, the lower the mount transmission force S. In other words, the higher the engine rotation speed Ne, the lower the mount transmission force S, and the smaller the vibration transmitted to the vehicle body.

Therefore, when the output of the rear electric motor RrMG is limited, the shift control unit 206 causes the automatic transmission 38 to shift gears so that the engine rotation speed Ne is maintained at a value equal to or greater than the predetermined rotation speed Nea. Here, the predetermined rotation speed Nea is obtained experimentally or by design in advance, and is set to a value corresponding to the frequency Fza at which the mount transmission force S becomes equal to or less than a preset allowable value Sa. The allowable value Sa of the mount transmission force S is set to a threshold value within a range in which vibration transmitted to the vehicle body through the engine mount 62 is allowed.

Figure 9:
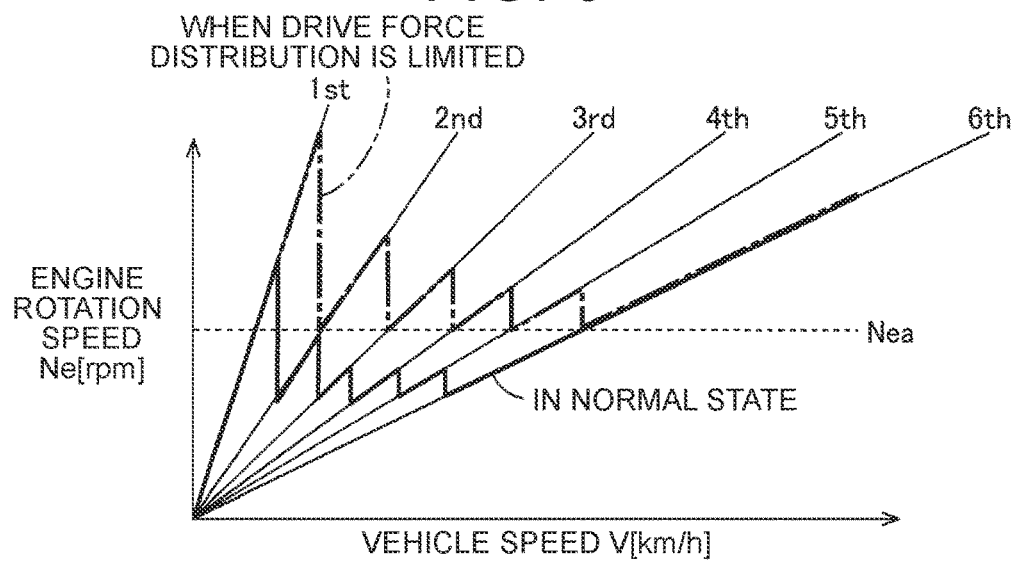
FIG. 9 is a diagram showing the relationship between the vehicle speed of an automatic transmission and the engine rotation speed.

FIG. 9 shows the relationship between the vehicle speed V of the automatic transmission 38 and the engine rotation speed Ne. The automatic transmission 38 of the present example is configured to be capable of shifting to gear stages of six forward speeds. Therefore, FIG. 9 illustrates straight lines indicating the relationship between the vehicle speed V corresponding to each gear stage (first gear stage 1st to sixth gear stage 6th) and the engine rotation speed Ne.

In FIG. 9, the solid line indicates the relationship between the vehicle speed V and the engine rotation speed Ne that is applied in the normal state, that is, when the RrMG torque of the rear electric motor RrMG is not limited (normal state). In the normal state, the engine rotation speed Ne changes according to the vehicle speed V along the solid line. On the other hand, the long dashed short dashed line indicates the relationship between the vehicle speed V and the engine rotation speed Ne when the RrMG torque of the rear electric motor RrMG is limited, that is, when the drive force distribution is limited. When the drive force distribution is limited, the engine rotation speed Ne changes according to the vehicle speed V along the long dashed short dashed line. Both the engine rotation speed Ne in the normal state indicated by the solid line and the engine rotation speed Ne when the drive force distribution is limited indicated by the long dashed short dashed line change in polygonal lines with sequential upshifting of the automatic transmission 38 as the vehicle speed V increases.

In the normal state indicated by the solid line, a region in which the engine rotation speed Ne is equal to or lower than the predetermined rotation speed Nea is used. In the normal state, when the engine rotation speed Ne becomes equal to or lower than the predetermined rotation speed Nea, the RrMG torque of the rear electric motor RrMG is increased to reduce the engine mount load Fmt, so that the transmission sensitivity of engine vibration transmitted to the vehicle body side through the engine mount 62 can be suppressed.

On the other hand, when the drive force distribution is limited as indicated by the long dashed short dashed line, since the output of the rear electric motor RrMG cannot be controlled to reduce the engine mount load Fmt, shifting of the automatic transmission 38 is performed so that the engine rotation speed Ne is maintained at a value equal to or greater than the predetermined rotation speed Nea. Therefore, since the engine rotation speed Ne is suppressed from becoming less than the predetermined rotation speed Nea, the engine vibration transmitted to the vehicle body through the engine mount 62 falls within an allowable range. The shift control unit 206 stores a shift map (shift line when the drive force distribution is limited) in which the engine rotation speed Ne is maintained at a value equal to or greater than the predetermined rotation speed Nea, and which is applied when the drive force distribution is limited. When the drive force distribution is limited, the shifting of the automatic transmission 38 is performed based on the shift map, so that the engine rotation speed Ne is maintained at a value equal to or greater than the predetermined rotation speed Nea.

Figure 10:
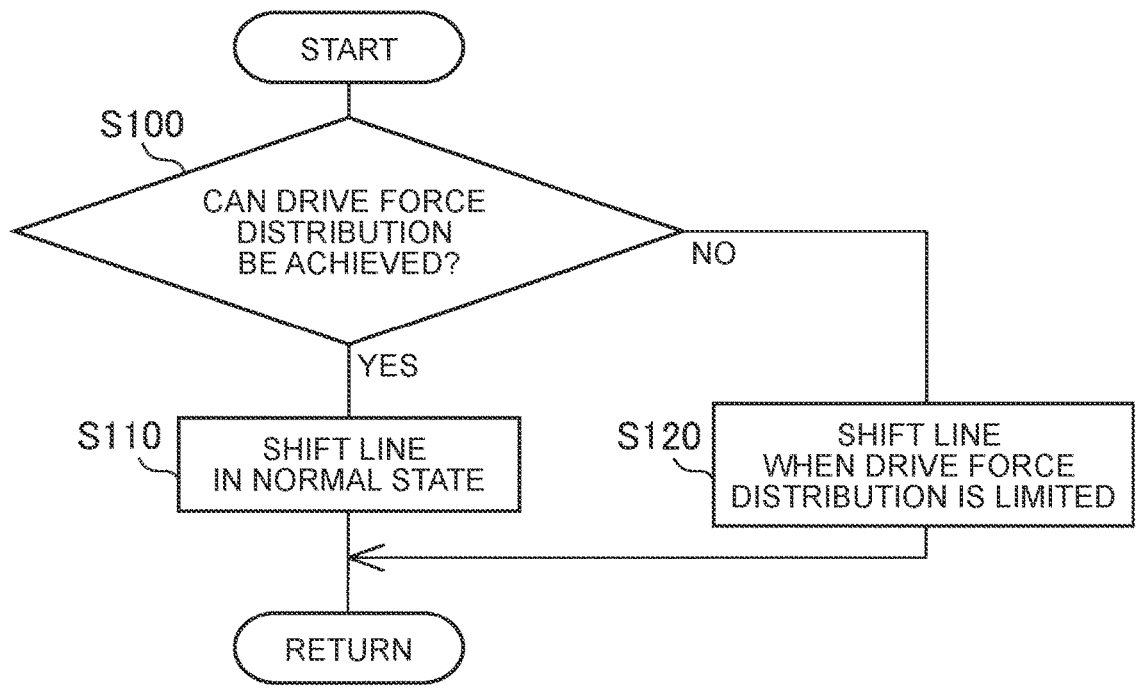
FIG. 10 is a flowchart illustrating main control operations of the electronic control device.

FIG. 10 is a flowchart illustrating the main control operation of the electronic control device 200, and is a flowchart illustrating the control operation that can suppress engine vibration transmitted to the vehicle body side through the engine mount 62, even when the drive force distribution between the front and rear wheels cannot be properly achieved. This flowchart is repeatedly executed while the vehicle is traveling.

First, in S100 corresponding to the control function of the availability determination unit 204, it is determined whether the drive force distribution between the front and rear wheels can be properly achieved. When an affirmative determination is made in S100, in S110 corresponding to the control function of the shift control unit 206, the shifting of the automatic transmission 38 is executed based on the shift map (shift line in normal state) used in the normal state. On the other hand, when a negative determination is made in S100, in S120 corresponding to the control function of the shift control unit 206, the shifting of the automatic transmission 38 is executed based on the shift map (shift line when drive force distribution is limited) in which the engine rotation speed Ne is maintained at a value equal to or greater than the predetermined rotation speed Nea.

As described above, according to the present example, when the output of the rear electric motor RrMG is limited, shifting of the automatic transmission 38 is performed so that the engine rotation speed Ne is maintained at a value equal to or greater than the predetermined rotation speed Nea. Therefore, the engine rotation speed Ne is maintained at a value equal to or greater than the predetermined rotation speed Nea, and the vehicle can continue traveling in a state in which the transmission sensitivity of the engine vibration to the vehicle body is decreased. As a result, the engine vibration transmitted through the engine mount 62 can be reduced.

Third Example

Figure 11:
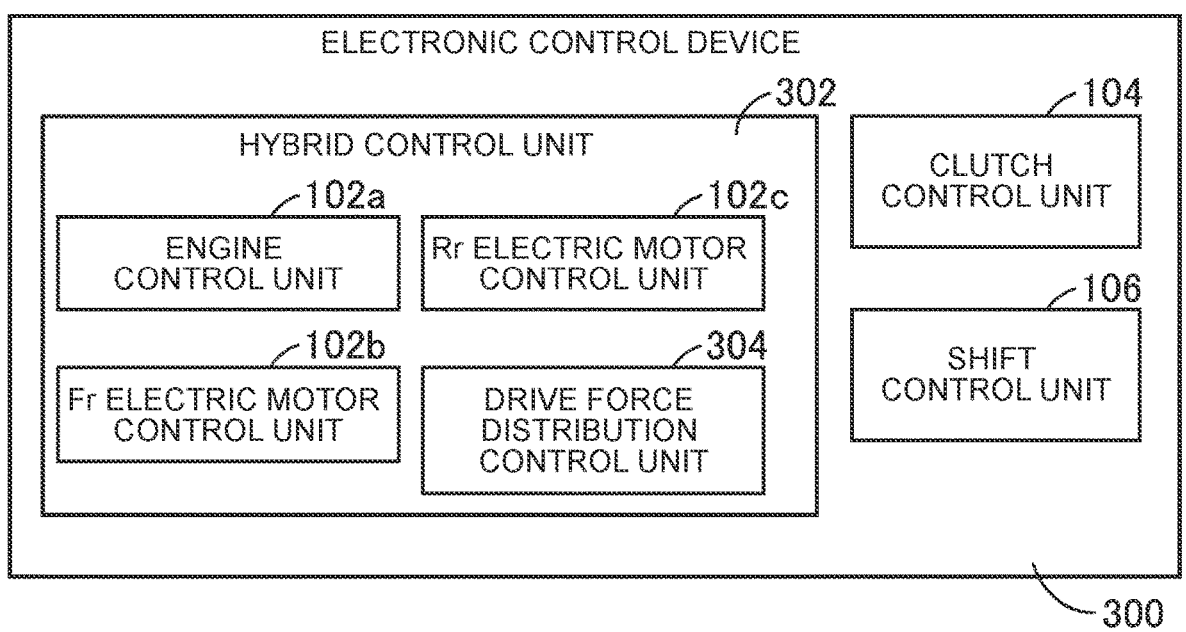
FIG. 11 is a functional block diagram illustrating main control functions of an electronic control device according to still another example of the present disclosure.

FIG. 11 is a functional block diagram illustrating main control functions of an electronic control device 300 according to still another example of the present disclosure. Note that the structure of the vehicle controlled by the electronic control device 300 is the same as that of the vehicle 10 of the above-described example, so the description thereof will be omitted.

The electronic control device 300 functionally includes a hybrid control unit 302, the clutch control unit 104, and the shift control unit 106. Note that the clutch control unit 104 and the shift control unit 106 have the same functions as those of the above-described example, so the same reference signs are given and the description thereof is omitted.

The hybrid control unit 302 functionally includes the engine control unit 102a, the Fr electric motor control unit 102b, the Rr electric motor control unit 102c, and a drive force distribution control unit 304. The engine control unit 102a, the Fr electric motor control unit 102b, and the Rr electric motor control unit 102c have the same functions as those of the above-described example, so the same reference signs are given and the description thereof is omitted.

The drive force distribution control unit 304 detects the engine rotation speed Ne, and when the engine rotation speed Ne is less than the predetermined rotation speed Neb set in advance, the drive force distribution control unit 304 increases the drive force distribution ratio R as compared to the drive force distribution ratio R that is set when the engine rotation speed Ne is equal to or greater than the predetermined rotation speed Neb. That is, when the engine rotation speed Ne is less than the predetermined rotation speed Neb, the drive force distribution control unit 304 increases the RrMG torque serving as the required drive amount of the rear electric motor RrMG compared to when the engine rotation speed Ne is equal to or greater than the predetermined rotation speed Neb. The predetermined rotation speed Neb is obtained experimentally or by design in advance, and is set based on the characteristics of the engine mount 62. The predetermined rotation speed Neb is set to a threshold value of the engine rotation speed Ne at which the engine vibration transmitted to the vehicle body via the engine mount 62 falls within an allowable range.

Figure 12:
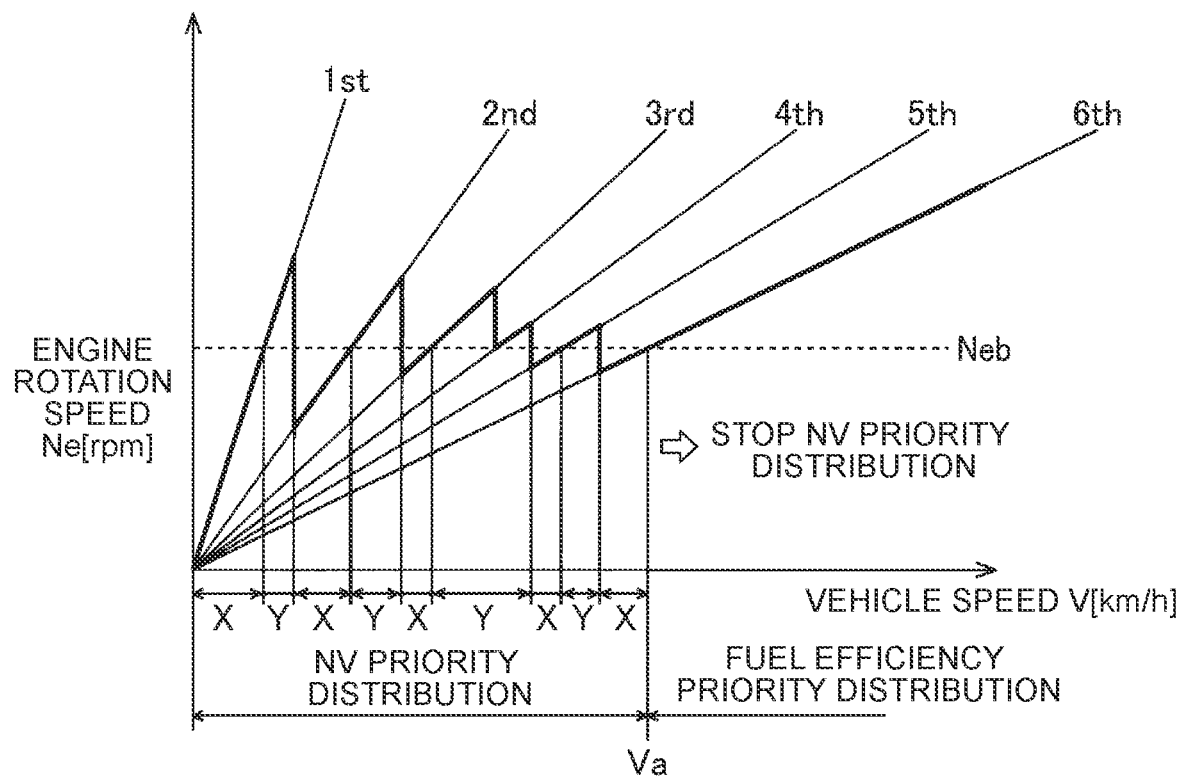
FIG. 12 is a diagram showing the relationship between the vehicle speed and the engine rotation speed in the present example.

FIG. 12 shows the relationship between the vehicle speed V and the engine rotation speed Ne in the present example. In FIG. 12, straight lines representing the relationship between the vehicle speed V and the engine rotation speed Ne are drawn for each gear stage of the automatic transmission 38 (first gear stage 1st to sixth gear stage 6th). As shown by the solid line in FIG. 12, as the automatic transmission 38 is upshifted as the vehicle speed V increases, the engine rotation speed Ne transitions to another gear stage while following the straight line of each gear stage, so that the engine rotation speed Ne changes in polygonal lines.

In the vehicle speed regions X shown in FIG. 12 where the engine rotation speed Ne is less than the predetermined rotation speed Neb, the engine vibration transmitted to the vehicle body through the engine mount 62 increases. In view of this, the drive force distribution control unit 304 increases the drive force distribution to the rear wheels 16 when the vehicle speed region X in which the engine rotation speed Ne is less than the predetermined rotation speed Neb is reached. Accordingly, since the required drive force Fedem of the engine 12 is relatively reduced, an increase in the engine mount load Fmt is suppressed, and the engine vibration transmitted to the vehicle body via the engine mount 62 is suppressed. In this way, in the vehicle speed region X where the engine rotation speed Ne is less than the predetermined rotation speed Neb, drive force distribution is performed with priority given to reducing NV (NV priority distribution).

Further, in the vehicle speed regions Y shown in FIG. 12 where the engine rotation speed Ne is equal to or greater than the predetermined rotation speed Neb, the engine vibration transmitted to the vehicle body through the engine mount 62 falls within an allowable range. At this time, the drive force distribution control unit 304 performs drive force distribution that prioritizes fuel efficiency (fuel efficiency priority distribution). Specifically, the drive force distribution control unit 304 reduces the drive force distribution ratio R to increase the drive force distribution to the front wheels 14 so that the vehicle 10 is caused to travel with the drive force of the engine 12, which is more efficient in terms of fuel efficiency. Accordingly, as shown in FIG. 12, the NV priority distribution (vehicle speed region X) and the fuel efficiency priority distribution (vehicle speed region Y) are alternately achieved. Here, when the NV priority distribution and the fuel efficiency priority distribution are repeated according to the change in the vehicle speed V, the drive force distribution ratio R is changed each time the vehicle speed region changes, which may deteriorate the drivability. In view of this, the vehicle speed Va shown in FIG. 12 may be used as a threshold value, and control may be performed so that the NV priority distribution is performed when the vehicle speed is less than the vehicle speed Va, and fuel efficiency priority distribution is performed when the vehicle speed is equal to or greater than the vehicle speed Va. The vehicle speed Va is a lower limit threshold value at which the engine rotation speed Ne is always equal to or greater than the predetermined rotation speed Neb.

Figure 13:
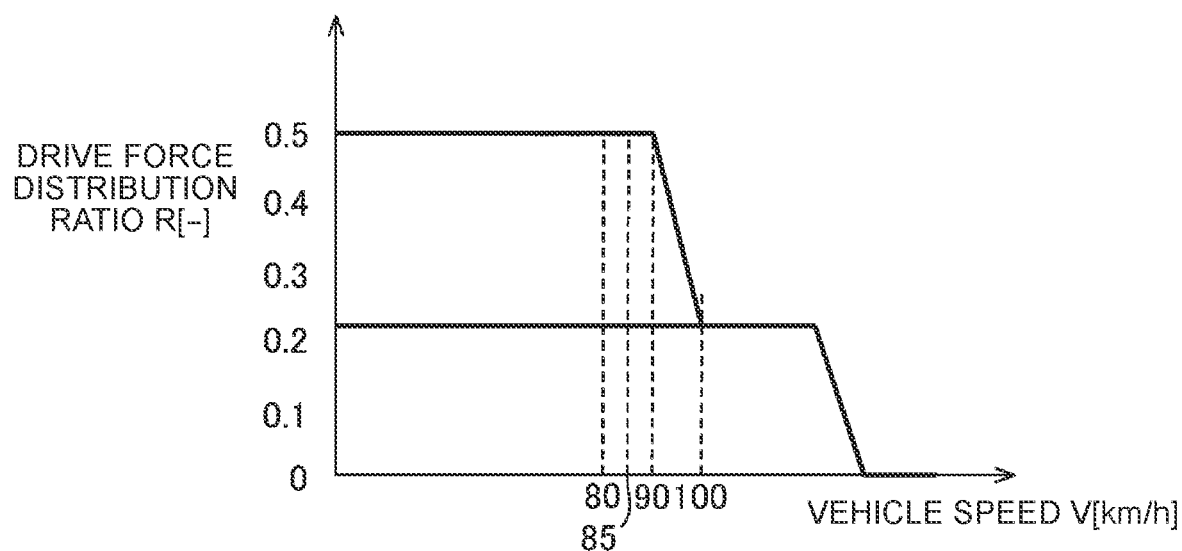
FIG. 13 is a diagram showing the drive force distribution ratio in consideration of resonance occurring in a suspension member.

Here, the vehicle speed Va at which the distribution is switched to the fuel efficiency priority distribution is set to a value that suppresses engine vibration transmitted to the vehicle body via the engine mount 62. However, it is also possible to set the vehicle speed Va in consideration of the vibration caused by other factors such as resonance occurring in a suspension member. FIG. 13 shows the drive force distribution ratio R in consideration of resonance occurring in the suspension member, for example. If the resonance occurring in the suspension member is not considered, the vehicle speed Va is set to 80 km/h, for example. Here, when the resonance of the suspension member occurs at the vehicle speed V of 85 km/h, the vehicle speed Va is changed to 90 km/h in consideration of the resonance of the suspension member. Therefore, as shown in FIG. 13, when the vehicle speed V becomes 90 km/h or more, the drive force distribution ratio R gradually decreases. In this way, the vehicle speed Va can be set to an appropriate value in consideration of other factors.

Figure 14:
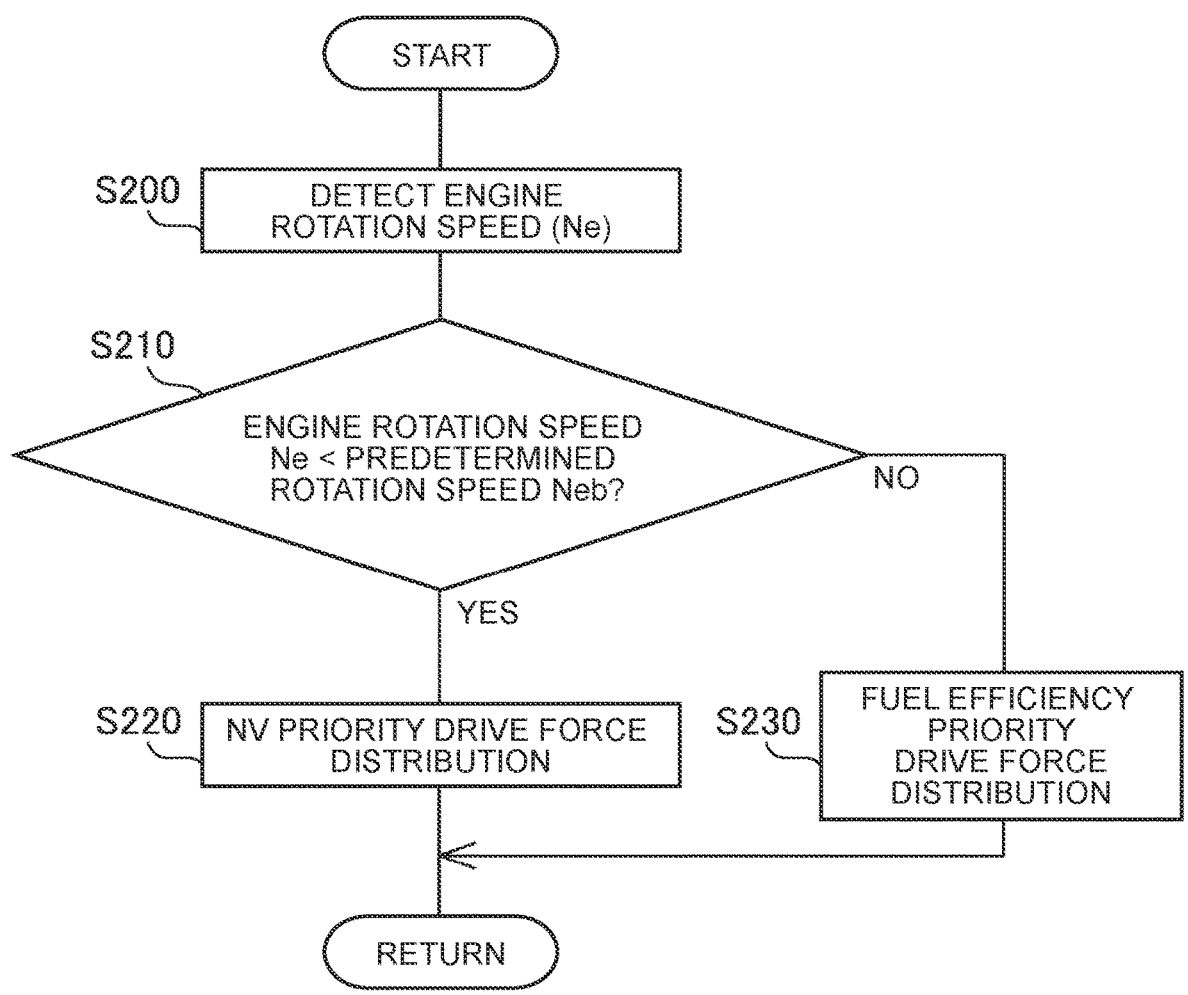
FIG. 14 is a flowchart illustrating main control functions of the electronic control device.

FIG. 14 is a flowchart illustrating the main control functions of the electronic control device 300 and a flowchart illustrating control functions capable of achieving both fuel efficiency and NV characteristics. This flowchart is repeatedly executed while the vehicle is traveling.

First, in S200 corresponding to the control function of the drive force distribution control unit 304, the engine rotation speed Ne is detected. Next, in S210 corresponding to the control function of the drive force distribution control unit 304, it is determined whether the engine rotation speed Ne is less than the predetermined rotation speed Neb. When an affirmative determination is made in S210, in S220 corresponding to the control function of the drive force distribution control unit 304, the drive force distribution to the front and rear wheels is controlled so that the NV characteristics are prioritized. Specifically, the drive force of the engine 12 is reduced by increasing the drive force distribution to the rear wheels 16 by the rear electric motor RrMG. As a result, the engine mount load Fmt applied to the engine mount 62 is reduced, so the engine vibration transmitted through the engine mount 62 is reduced. On the other hand, when a negative determination is made in S210, in S230 corresponding to the control function of the drive force distribution control unit 304, the drive force distribution to the front and rear wheels is controlled so that the fuel efficiency is prioritized. Specifically, control is performed so that the drive force of the engine 12 is exclusively used to drive the front wheels 14. As a result, the proportion of the power that is transmitted to the rear wheels 16 via the electrical path among the power of the engine 12 is reduced, thereby reducing energy loss and improving fuel efficiency.

As described above, according to the present example, when the engine rotation speed Ne is less than the predetermined rotation speed Neb set based on the characteristics of the engine mount 62, the RrMG torque of the rear electric motor RrMG is increased as compared to when the engine rotation speed Ne is equal to or greater than the predetermined rotation speed Neb. Thus, by increasing the RrMG torque of the rear electric motor RrMG only when the engine vibration transmitted to the vehicle body side via the engine mount 62 is likely to be transmitted, the crushing of the engine mount 62 is reduced, and the engine vibration transmitted to the vehicle body side is reduced. As a result, it is possible to achieve both NV characteristics and fuel efficiency.

Although the examples of the present disclosure have been described in detail with reference to the drawings, the present disclosure also applies to other modes.

For example, the first example to the third example described above are implemented independently, but may be appropriately combined and implemented. For example, the first example and the second example can be combined, and the mode of the first example can be implemented when the drive force distribution between the front and rear wheels can be achieved, and the mode of the second example can be implemented when the drive force distribution between the front and rear wheels can no longer be achieved. Similarly, the second example and the third example can also be combined and implemented.

In the above-described examples, the engine 12 and the front electric motor FrMG are connected to the front wheels 14 so as to be able to transmit power, and the rear electric motor RrMG is connected to the rear wheels 16 so as to be able to transmit power. However, the engine 12 and the rear electric motor RrMG may be connected to the rear wheels 16 so as to be able to transmit power, and the front electric motor FrMG may be connected to the front wheels 14 so as to be able to transmit power. In this case, the front wheels 14 correspond to the second wheels of the present disclosure and the rear wheels 16 correspond to the first wheels of the present disclosure. Also, the front electric motor FrMG corresponds to the electric motor of the present disclosure, and the rear electric motor RrMG corresponds to the second electric motor of the present disclosure.

In the above-described examples, the rear wheels 16 are driven by the rear electric motor RrMG, but may be driven by other drive force sources such as hydraulic motors. That is, the present disclosure can be appropriately applied as long as the configuration is such that while the first wheels are connected to the engine 12 so as to be able to transmit power, the second wheels are connected to a drive force source other than the engine 12 so as to be able to transmit power, so that the drive force distribution to the front and rear wheels can be achieved.

Further, in the above-described examples, the automatic transmission 38 is configured to be capable of shifting to gear stages of six forward speeds and one reverse speed, but the present disclosure is not limited to gear stages of six forward speeds. For example, any transmission capable of shifting to a plurality of gear stages, such as a transmission capable of shifting to gear stages of 10 speeds, can be appropriately applied.

Further, in the above-described examples, the drive force distribution to the front and rear wheels is changed based on the magnitude of the required drive force Fedem of the engine 12, but the drive force distribution between the front and rear wheels may be changed based on the magnitude of the required engine torque Tedem of the engine 12. That is, the required engine torque Tedem may be used instead of the required drive force Fedem of the engine 12 as the required drive amount of the present disclosure.

In the above-described examples, the drive force distribution ratio R is defined by the ratio of the drive force transmitted to the rear wheels 16 to the vehicle required drive force Frdem. However, the drive force distribution ratio R may be defined by the ratio of the drive force transmitted to the front wheels 14 to the vehicle required drive force Frdem.

Further, the specific numerical values in the above-described examples are merely examples, and may be changed as appropriate according to the type, structure, etc. of the vehicle.

It should be noted that the examples described above are merely embodiments, and the present disclosure can be implemented in a mode in which various changes and improvements are made based on the knowledge of those skilled in the art.

What is claimed is:

1. A control device for a vehicle that includes (a) an engine provided in the vehicle via an engine mount and connected to first wheels that are either front wheels or rear wheels of the vehicle so as to be able to transmit power to the first wheels, and (b) a drive force source provided separately from the engine and connected to second wheels that are the other of the front wheels and the rear wheels of the vehicle so as to be able to transmit power to the second wheels, the control device comprising a processor configured to:
   switch between two-wheel drive traveling in which the first wheels are driven by the engine, and four-wheel drive traveling in which the first wheels are driven by the engine and the second wheels are driven by the drive force source, and
   increase a required drive amount of the drive force source when a required drive amount of the engine becomes equal to or greater than a predetermined value while the vehicle is traveling, wherein
   the predetermined value is determined so that a load of the engine mount does not exceed a predetermined load of the engine mount, and
   the predetermined load of the engine mount is a load at which a deformation amount of the engine mount does not exceed a predetermined threshold deformation amount of the engine mount.

2. The control device according to claim 1, the vehicle further including a transmission that is provided in a power transmission path between the engine and the first wheels, wherein
   when an output of the drive force source is limited, the processor causes the transmission to shift gears such that a rotation speed of the engine is maintained at a predetermined rotation speed or higher, and
   the predetermined rotation speed of the engine is determined so that a vibration transmitted to a vehicle body through the engine mount at the predetermined rotation speed does not exceed a threshold vibration amount.

3. The control device according to claim 2, wherein
   the drive force source is an electric motor for traveling, and
   the processor performs drive force distribution to the front wheels and the rear wheels by controlling an output of the electric motor.

4. The control device according to claim 3, the vehicle further comprising a second electric motor connected to the engine so as to be able to transmit power, wherein
   the second electric motor is configured to be able to generate electric power with power of the engine, and
   the processor drives the electric motor with at least one of electric power from a battery provided in the vehicle and electric power generated by the second electric motor.

5. The control device according to claim 1, wherein
   when a rotation speed of the engine is less than a predetermined rotation speed set based on characteristics of the engine mount, the processor increases the required drive amount of the drive force source as compared to when the rotation speed of the engine is equal to or greater than the predetermined rotation speed, and
   the predetermined rotation speed of the engine is determined so that a vibration transmitted to a vehicle body through the engine mount at the predetermined rotation speed does not exceed a threshold vibration amount.

6. The control device according to claim 5, wherein
   the drive force source is an electric motor for traveling, and
   the processor performs drive force distribution to the front wheels and the rear wheels by controlling an output of the electric motor.

7. The control device according to claim 6, the vehicle further comprising a second electric motor connected to the engine so as to be able to transmit power, wherein
   the second electric motor is configured to be able to generate electric power with power of the engine, and
   the processor drives the electric motor with at least one of electric power from a battery provided in the vehicle and electric power generated by the second electric motor.

8. The control device according to claim 1, wherein
   the drive force source is an electric motor for traveling, and
   the processor performs drive force distribution to the front wheels and the rear wheels by controlling an output of the electric motor.

9. The control device according to claim 8, the vehicle further comprising a second electric motor connected to the engine so as to be able to transmit power, wherein
   the second electric motor is configured to be able to generate electric power with power of the engine, and the processor drives the electric motor with at least one of electric power from a battery provided in the vehicle and electric power generated by the second electric motor.

\* \* \* \* \*